(12) United States Patent
Rodriguez

(10) Patent No.: US 6,516,160 B1
(45) Date of Patent: Feb. 4, 2003

(54) ESTIMATION OF TONER USAGE BASED ON PULSE WIDTH COUNT AND PULSE EDGE COUNT

(75) Inventor: Santiago Rodriguez, Boise, ID (US)

(73) Assignee: Hewlett-Packard Co., Palo Alto, CA (US)

(*) Notice: Subject to any disclaimer, the term of this patent is extended or adjusted under 35 U.S.C. 154(b) by 0 days.

(21) Appl. No.: 09/928,502

(22) Filed: Aug. 14, 2001

(51) Int. Cl.[7] .............................................. G03G 15/08
(52) U.S. Cl. ........................................................ 399/27
(58) Field of Search .............................. 399/27, 47, 49, 399/51, 177; 347/131, 133, 252, 254; 358/456, 459, 300, 302

(56) References Cited

U.S. PATENT DOCUMENTS

| 5,349,377 A | * | 9/1994 | Gilliland et al. ............. 347/131 |
| 5,655,174 A | * | 8/1997 | Hirst ............................. 347/19 |
| 5,724,627 A | * | 3/1998 | Okuno et al. ................. 399/27 |
| 5,771,420 A | * | 6/1998 | Suzuki et al. ................. 399/25 |
| 5,867,198 A | * | 2/1999 | Gwaltney et al. ........... 347/131 |
| 5,970,275 A | * | 10/1999 | Brown et al. ................. 399/24 |
| 6,173,134 B1 | * | 1/2001 | Nishimura et al. ........... 399/58 |

FOREIGN PATENT DOCUMENTS

| JP | 09006195 A | * | 1/1997 | .......... G03G/21/00 |
| JP | 2001194842 A | * | 7/2001 | .......... G03G/15/00 |

* cited by examiner

Primary Examiner—Robert Beatty

(57) ABSTRACT

The invention includes a method, a computer readable medium, and an apparatus of estimating toner usage based on pulse width count and pulse edge count. In one respect, the invention includes a method for estimating toner usage. The method comprises determining a pulse width count, determining a pulse edge count, and calculating a toner usage value based on the pulse width count and the pulse edge count. In another respect, the invention includes a computer readable medium on which is embedded computer software. The software comprises a program. The program performs the above mentioned method. In yet another respect, the invention includes a system. The apparatus may be configured to perform the above mentioned method.

25 Claims, 4 Drawing Sheets

ESTIMATION OF TONER USAGE BASED ON PULSE WIDTH COUNT AND PULSE EDGE COUNT

FIELD OF THE INVENTION

This invention relates generally to printing, and more particularly to an estimation of toner usage.

BACKGROUND OF THE INVENTION

It is generally known that electrophotographic printers utilize toner to generate text and/or images on a print medium, such as, paper. In this regard, a toner cartridge is typically employed to store the toner. In the event the toner cartridge runs out of toner in the middle of a print job, paper and time may be wasted and users may become frustrated. Thus, to ensure sufficient quantities of toner for a print job, sensors are often utilized to measure the toner level. However, sensors are expensive. In this regard, methods of toner estimation may be employed.

Previous inventions have disclosed methods of estimating toner usage for a print job. Typically, the toner usage is estimated for each print job. If the estimate indicates that insufficient toner is remaining in the toner cartridge, a user may be notified. For example, U.S. Pat. No. 5,802,420 discloses a method of predicting toner usage based upon printing history. For example, if a certain amount of toner was used to print the last 10 pages, the next 10 pages is estimated to use that same amount. U.S. Pat. No. 5,937,255 discloses a method of estimating toner usage based upon a pixel count. For example, if "T" amount of toner is used to generate one pixel, then 100 pixels is estimated to use 100×T amount of toner.

However, different pixels may not utilize the same amount of toner. For example, in the assignee's HP Monochrome and Color LaserJet™, a laser light source is modulated as it scans across the surface of an optical photoreceptor ("OPR"). To create a pixel, the laser light source may be modulated (or pulsed) to illuminate a desired pixel location. However, the pixel does not represent a fixed quantity of toner. For each pulse, the length of time (or duration) the laser is on as it scans across the OPR correlates to the width of the pulse on the OPR surface. The width and number of pulses used to create a pixel may vary from one pixel to another pixel. For example, to produce certain fine details, it may be advantageous to produce relatively narrow pixels. Thus, the duration of the pulse used to create the relatively narrow pixel may be correspondingly short. Conversely, relatively wider pulses may be used to produce a substantially solid line across the page.

Moreover, even for a given sized pixel, the amount of toner used may vary from pixel to pixel. For example, the number of pulses used to create a pixel may differ from pixel to another. A first pixel may be produced with a single pulse. A second pixel may be produced with more than one pulses. However, the first and second pixel may be substantially the same size despite using varying amount of toner based on the number of pulses.

SUMMARY OF THE INVENTION

The invention includes a method, a computer readable medium, and a system of estimating toner usage based on pulse width count and pulse edge count.

In one respect, the invention includes a method for estimating toner usage. The method comprises determining a pulse width count, determining a pulse edge count, and calculating a toner usage value based on the pulse width count and the pulse edge count.

In another respect, the invention includes a computer readable medium on which is embedded computer software. The software comprises a program. The program performs a method of estimating toner usage of a laser printer. The method comprises determining a pulse width count, determining a pulse edge count, and calculating a toner usage value based on the pulse width count and the pulse edge count.

In yet another respect, the invention includes an apparatus for estimating toner usage. The apparatus comprises a processor system configured to determine a pulse width count and a pulse edge count based on a print job, wherein the processor system is further configured to calculate the toner usage based on the pulse width count and the pulse edge count.

In comparison to known prior art, certain embodiments of the invention are capable of achieving certain advantages, including some or all of the following: (1) accurate estimation of toner usage; (2) less expensive; (3) capable of being decentralized and (4) more robust. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

For simplicity and illustrative purposes, the principles of the invention are described by referring mainly to an exemplary embodiment thereof, particularly with references to a system to laser printer. However, one of ordinary skill in the art would readily recognize that the same principles are equally applicable to, and can be implemented in, a system capable of utilizing colorant (e.g., toner, ink, pigment, dye, et.) to produce text and/or one or more images on a print medium, and that any such variations are within the scope of the invention. Furthermore, the same principles are equally applicable to, and can be implemented in, a system capable of utilizing a material (e.g., metal, plastic, resin, wax, etc.) to produce a substantially, two dimensional image or a three dimensional object.

Figure 1:
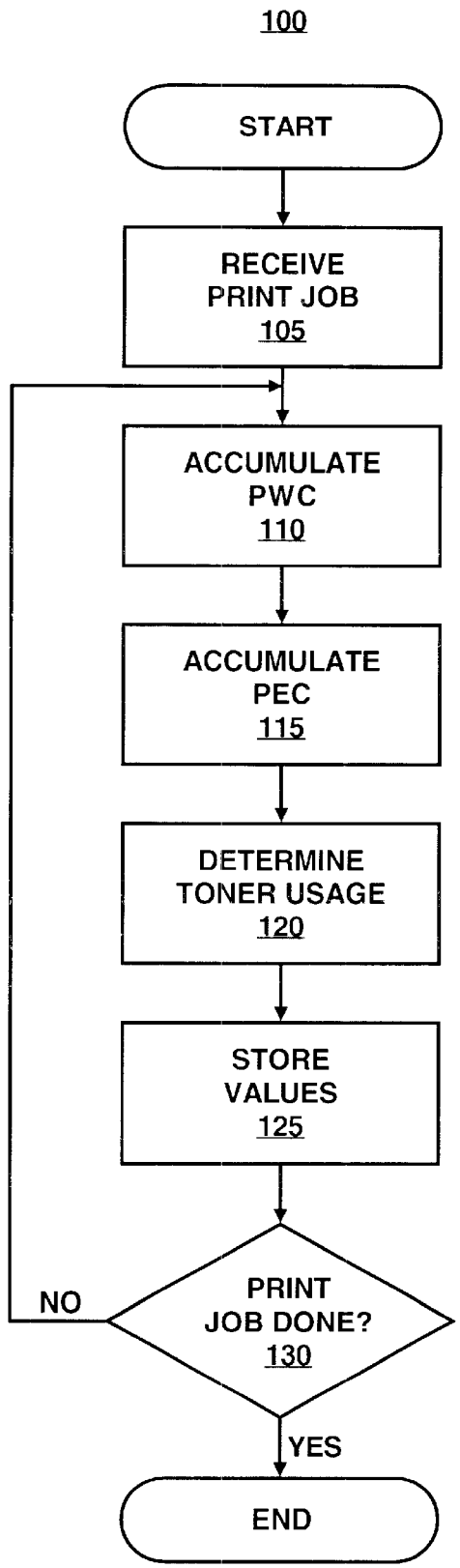
FIG. 1 is a flow chart of an exemplary method, in accordance with a manner in which an embodiment of the invention may be practiced.

FIG. 1 is a flow chart of a method 100, in accordance with a manner in which an embodiment of the invention may be practiced. As depicted in FIG. 1, the method 100 is initiated in response to receiving a print job in step 105. The print job is typically initiated by a user operating a computer or terminal on the local area network ("LAN") in which a printer is located. However, it is within the scope of this invention that the print job may be received in any manner known to those skilled in the art. For example, the printer may be directly attached to a computer. Furthermore, it is within the scope of this invention that the printer and the print job input device (e.g., keyboard, scanner, etc.) be a single device. For example, an electronic typewriter and/or "all in one device", such as a printer/copier/fax machine.

Figure 3:
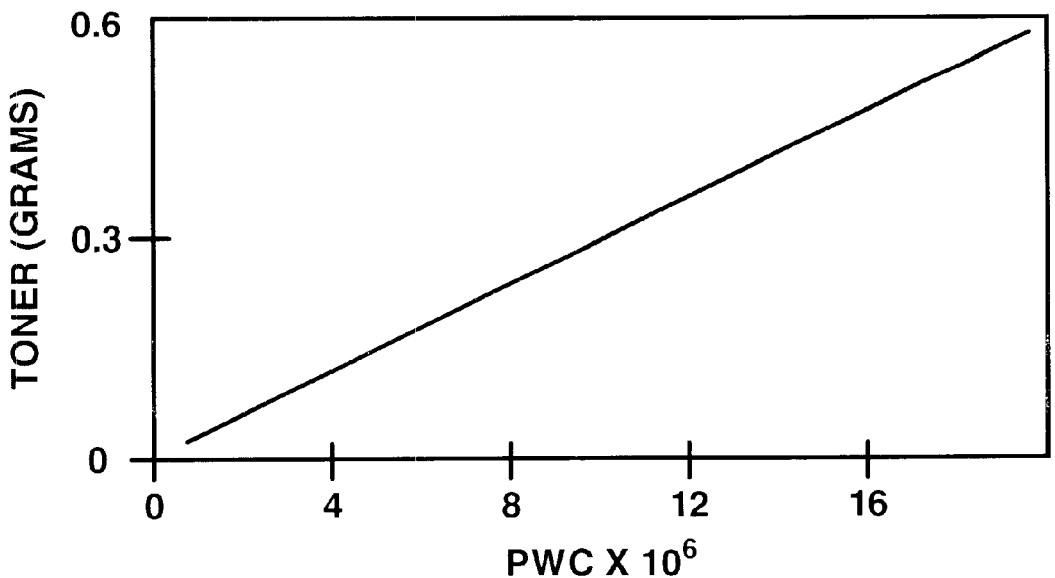
FIG. 3 is an exemplary graph, in accordance with an embodiment of the invention described in FIG. 1, of pulse width count×$10^6$ (abscissa) as it affects the weight, in grams, of toner (ordinate)

The print job may include text, solid lines, and/or half tones. When printing text or a solid line (e.g., a line drawing) in a document, a relatively large pulse width count ("PWC") is accumulated as compared to printing a half tone (e.g., a half tone image or shading). The PWC is a measure of the accumulated width of pulses. Due to the fact that pixels may not represent fixed units of toner usage, the PWC correlates to the amount of toner transferred more accurately than an accumulated count of pixels and/or dots. While in a preferred form the PWC is accumulated per page, the PWC may be accumulated per pixel, per scan line, per page, per print job, per usable lifespan of the toner cartridge, etc. Additionally, and as illustrated in FIG. 3, toner usage for a fixed pulse edge count value is altered as a function of PWC.

Half tones are typically used to create shading and images by basically altering the perception of color intensity by manipulating the density of a pattern of dots. For example, the color of a high density of black dots may be perceived as black, however, a low density of black dots may be perceived as light gray. While pixels are often thought of as dots, for the purpose of this disclosure, a pixel may be a dot or a cluster of sub-pixel sized dots. When printing a relatively high resolution half tone image, a pixel may be produced with as many as 255 dots, each dot being the result of a pulse. Typically, when printing a half tone image, the dots do not touch one another. Each dot may be said to be defined by a substantially circular edge surrounding it. Thus, half tones have a relatively high number of edges as compared to text and lines.

Figure 4:
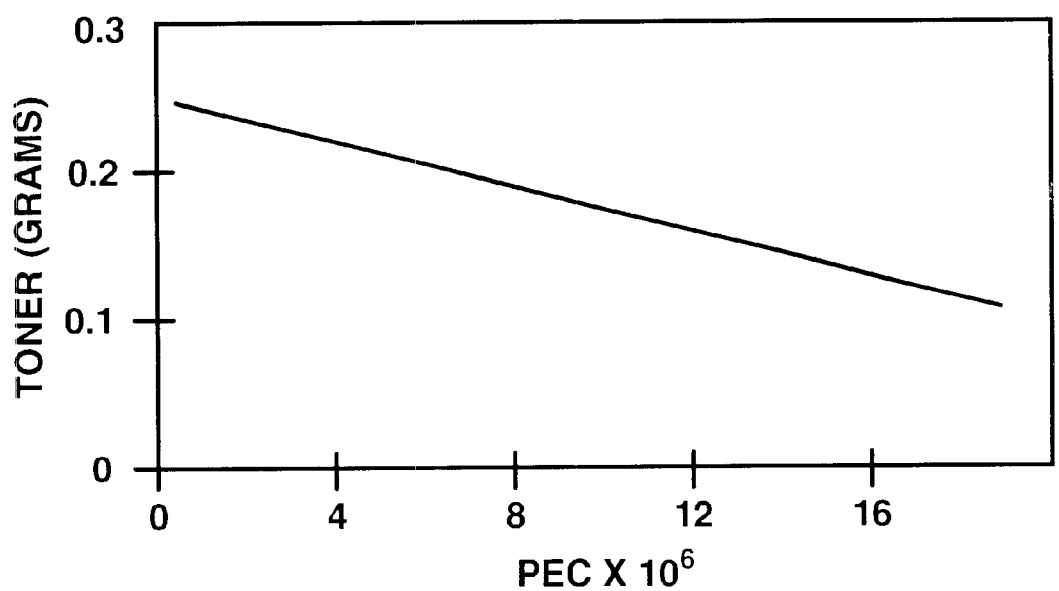
FIG. 4 is an exemplary graph, in accordance with an embodiment of the invention described in FIG. 1, of pulse edge count×$10^6$ (abscissa) as it affects the weight, in grams, of toner (ordinate)

For a given PWC, varying the number of substantially isolated dots results in a varying amount of toner transfer. A pulse edge count ("PEC") is a measure of the accumulated isolated dots. In this regard, the effect on toner usage of varying the PEC for a fixed PWC value is illustrated in FIG. 4. While in a preferred form the PEC is accumulated per page, the PEC may be accumulated per pixel, per scan line, per page, per print job, per usable lifespan of the toner cartridge, etc.

Figure 5:
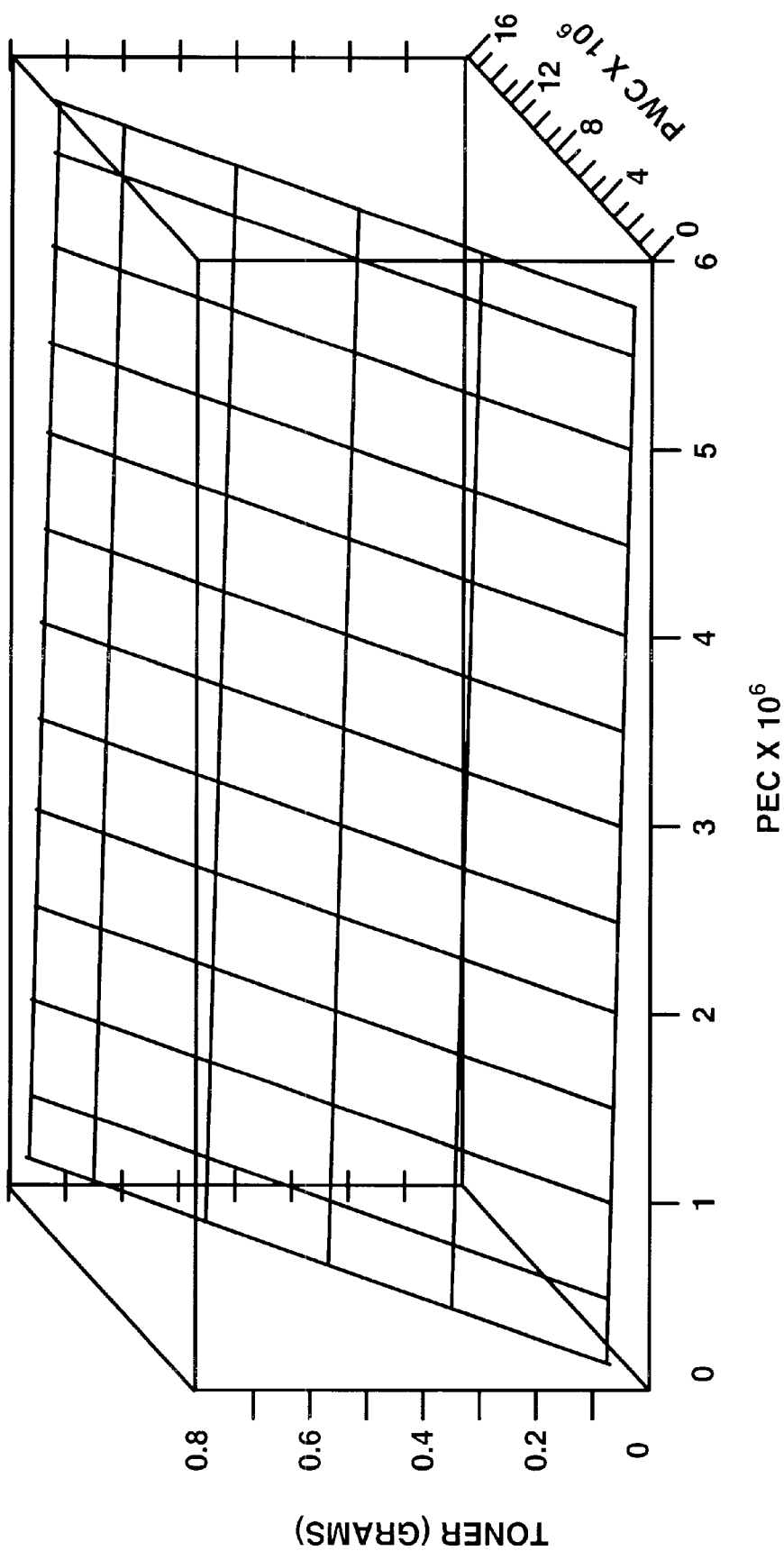
FIG. 5 is an exemplary three dimensional graph, in accordance with an embodiment of the invention described in FIG. 1, of pulse width count (x-axis) and pulse edge count (y-axis) as it affects the weight, in grams, of toner transferred to a printed page (z-axis).

Thus, the combination of PWC and PEC in a statistical regression equation ("SRE") greatly increases the ability to accurately estimate toner usage. For example, estimation of toner usage utilizing PWC and PEC correlates to actual toner usage by as much as 50% more accurately than pixel counting alone. In general, the SRE may be described by the following:

$$TU = f(PEC, PWC)$$

Where TU is toner usage and f is some function A specific example of an SRE may be described by the following:

$$TU = C1 + C2*PEC + C3*PWC$$

Where C1, C2, and C3 are determined by a statistical regression. The C1, C2, and C3 parameters will, in general, vary depending on the product, and may be empirically determined. Although a specific example of an SRE is given, it is to be understood that the invention is not limited to this specific example of an SRE, but rather, the invention may utilize any reasonable equation or technique correlating PWC and PEC to toner usage. In one respect, the equation may correspond to the specific printing system. Accordingly, the specific example of an SRE is for illustrative purposes only and thus is not meant to limit the invention in any respect. Additionally, and as illustrated in FIG. 5, toner usage as a function of PWC and PEC may be expressed as a surface in a three dimensional graph.

Referring again to FIG. 1, in step 110, the PWC may be accumulated based on the print job or corresponding printer specific commands generated in response to the print job. The PWC may be determined at the time the print job is generated, after the print job has finished printing, and/or any time in between. In a preferred form, the PWC may be accumulated while printing the print job. A PWC for each pixel may be determined. An accumulated PWC value for each scanned line may be determined by adding the respective PWC values of the pixels within each scanned line. An accumulated PWC value for each page may be determined in a variety of ways. For example, the respective PWC values for the scan lines within the page may be summed. In another example, the respective PWC values of the pixels within the page may be summed. In yet another example, some combination of PWC values of pixels and/or scan lines within the page may be summed. In a similar manner to the determination of accumulated page PWC values, PWC values for the print job and/or the usable lifespan of the toner cartridge PWC values may be determined.

In step 115, the PEC may be accumulated based on the print job or corresponding printer specific commands generated in response to the print job. In a manner similar to accumulating PWCs in step 110, the PECs for pixels, scan lines, pages, the print job and the usable lifespan of the toner cartridge may be determined. The steps 110 and 115 need not be performed in the order as shown in FIG. 1, but rather, the steps 110 and 115 may be performed in the opposite order, simultaneously, or any variation therein.

In step 120, the toner usage may be determined. To determine the toner usage, the PWC and PEC values may be referenced in conjunction with a look up table ("LUT"), such as, the LUT disclosed in U.S. Pat. No. 5,793,406 and is herein incorporated by reference. Additionally or instead of the LUT, a statistical regression equation ("SRE") substantially the same as the SRE used to generate the LUT may be used to determine the toner usage without departing from the scope of the invention. In general, the LUT may be thought of as a predetermined or static SRE that is less resource intensive than the SRE but less capable of adjustability. A combination of LUT and SRE may be incorporated in such a way as to utilize the LUT for common PWC/PEC values, thus saving system resources and increasing print speed. The SRE may be utilized for uncommon PWC/PEC values to increase accuracy of toner estimation. Moreover, the SRE and/or the LUT may take into account the following factors: system design, toner chemistry, OPR sensitivity, PWC, PEC, temperature, relative humidity, empirical data, etc.

While step 120 is depicted following steps 110 and 115, step 120 need not be performed after steps 110 and 115, but rather, step 120 may be performed simultaneously with, or after steps 110 and/or 115.

In step 125, the accumulated PWC, PEC, and/or toner usage values may be stored to non-volatile memory. In a preferred form, toner usage values are stored for each page of the print job, however, any or all of the values may be stored.

In step 130, it is determined if the method 100 has reached the end of the print job or the corresponding printer specific commands generated in response to the print job. For example, if an end of file marker is encountered, the method 100 may terminate. If it is determined that the end of the print job or the corresponding printer specific commands generated in response to the print job has not been reached, the method 100 may return to step 110.

Figure 2:
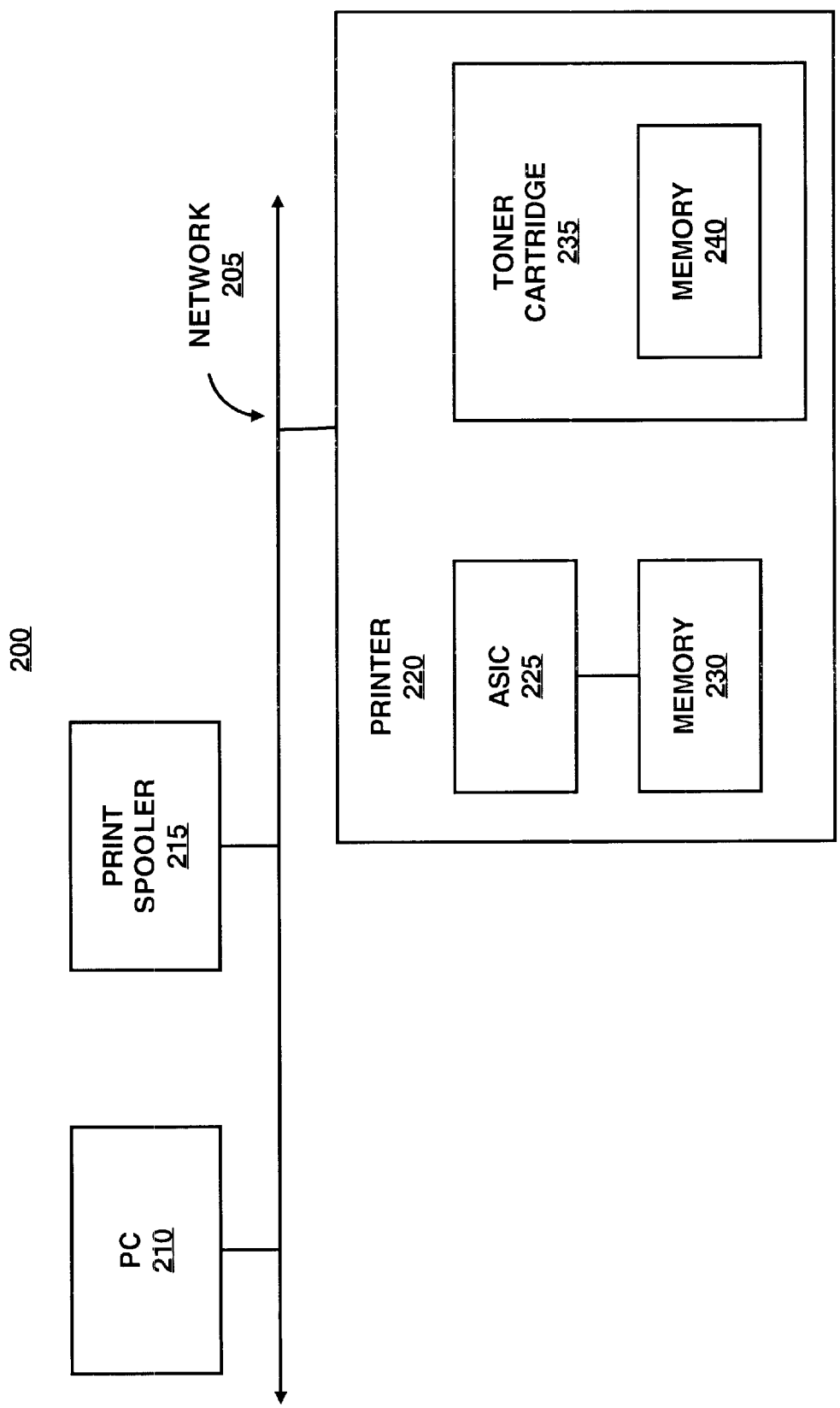
FIG. 2 is a block diagram of an exemplary system, in accordance with an embodiment of the invention described in FIG. 1.

FIG. 2 is a block diagram of a system 200, in accordance with an embodiment of the invention described in FIG. 1. Accordingly, the following description of FIG. 2 will be made with particular reference to FIG. 1. As shown in FIG. 2, the system 200 includes a network 205. The system 200 further includes a PC 210, a print spooler 215 and a printer 220 configured to communicate via the network 205. Additionally, the system 200 may include other components configured to communicate via the network 205, such as, routers, servers, other PCs, other printers, etc. Moreover, the system 200 may be configured to communicate with the Internet via the network 205.

The PC 210 may be configured to provide the capability to generate a print job as described in step 105 of FIG. 1. The print job may be forwarded to the print spooler 215 across the network 205. In another form, the PC 210 may be directly connected to the printer 220. Although not shown in FIG. 2, the printer 220 and the PC 210 maybe a single device. For example, an electronic typewriter. Furthermore, it is within the scope of the invention that the printer 220 may be an "all in one device", such as a printer/copier/fax machine.

The print spooler 215 may be configured to accept the print job via the network 205. The print spooler 215 may further be configured to forward the print job to the printer 220 and/or store the print job until the printer 220 is ready to accept it. Typically, the print job is forwarded as a stream of bits corresponding to how each page of the print job appears and, in a process described in more detail below, the printer 220 computes printer specific commands (e.g., laser pulse modulation). However, it is within the purview of the invention that the printer specific commands may be generated by the PC 210, the print spooler 215, the printer 220, and/or various other components configured to communicate via the network 205. Additionally, the PWC, the PEC, the pixel count, and the toner usage values may be generated by the PC 210, the print spooler 215, the printer 220, and/or various other components configured to communicate via the network 205.

According to a preferred embodiment illustrated in FIG. 2, the printer 220 is a laser printer. In other words, the printer 220 utilizes a modulated laser to alter the electrostatic charge on an OPR in an electrophotographic process known to those skilled in the art. According to the principles of the invention, a number of different types of laser printers may be utilized for proper operation of the invention. Additionally, the term "laser printer" is not intended to be a limitation, but rather, with respect to the disclosure, describes a printer in which toner or ink is applied to the surface of a material in the form of pixels. Thus, it is within the purview of this invention that any known printer capable of suitably varying the width and/or edge count of pixels may be substituted for the printer without departing from the scope of this invention.

The printer 220 includes an application specific integrated circuit ("ASIC") 225. The ASIC 225 may be configured to send and receive information (e.g., printer identity, printer specific commands, toner remaining, the print job, etc.). The ASIC 225 may further be configured to store the print job to a memory 230. The ASIC 225 may further be configured to convert the print job into printer specific commands. Based on the printer specific commands, the ASIC 225 may be configured to calculate PWC, PEC, pixel count, toner usage, etc. A memory 230 within the printer 220 and connected to the ASIC 225 may be configured to store data for the ASIC 225. The data may include the print job, printer specific commands, PWC, PEC, pixel count, toner usage, etc.

The printer 220 may include a toner cartridge 235. The toner cartridge 235, being filled with a predetermined amount of toner, may be configured to dispense a measured amount of toner as required. The toner remaining may be calculated based on the predetermined amount of toner and the toner usage. The toner cartridge 235 may include a memory 240. The memory 240 may be non-volatile, for example, electronically erasable programmable read only memory ("EEPROM"). The memory 240 may be configured to store data related to toner usage and/or toner remaining. The toner cartridge may further be configured for communication with the ASIC 225.

FIG. 3 is an exemplary graph, in accordance with an embodiment of the invention described in FIG. 1, of PWC× $10^6$ (abscissa) as it affects the weight, in grams, of toner (ordinate) for a fixed PEC value. As shown in FIG. 3, toner transfer per PWC can be described by a function plotted in terms of weight of toner transferred to the printing media. Although not depicted in FIG. 3, toner transfer is also dependent upon PEC and thus, the exemplary graph depicted in FIG. 3 may only be representative for a fixed value of PEC.

Additionally, it is to be understood that the invention is not limited to a function of the graph illustrated in FIG. 3, but rather, the invention may include any reasonable function correlating toner usage to PWC for a given PEC. Accordingly, the graph depicted in FIG. 3 is for illustrative purposes only and thus is not meant to limit the present invention in any respect.

FIG. 4 is an exemplary graph, in accordance with an embodiment of the invention described in FIG. 1, of PEC× $10^6$ (abscissa) as it affects the weight, in grams, of toner (ordinate) for a fixed PWC value. As shown in FIG. 4, toner transfer per PEC can be described by a function plotted in terms of weight of toner transferred to the printing media. Although not depicted in FIG. 4, toner transfer is also dependent upon PWC and thus, the exemplary graph depicted in FIG. 4 may only be representative for a fixed value of PWC.

Additionally, it is to be understood that the invention is not limited to a function of the graph illustrated in FIG. 4, but rather, the invention may include any reasonable function correlating toner usage to PEC for a given PWC. Accordingly, the graph depicted in FIG. 4 is for illustrative purposes only and thus is not meant to limit the present invention in any respect.

FIG. 5 is an exemplary three dimensional graph, in accordance with an embodiment of the invention described in FIG. 1, of PWC (x-axis) and PEC (y-axis) as it affects the weight, in grams, of toner transferred to a printed page (z-axis). As shown in FIG. 5, toner transfer per PWC and PEC can be described by a surface. Although FIG. 5 depicts the surface as approximately planer, the surface may be any reasonable result of an equation correlating PWC and PEC to toner transfer. Accordingly, the graph depicted in FIG. 5 is for illustrative purposes only and thus is not meant to limit the present invention in any respect.

Moreover, toner usage is determined based upon system design, empirically determined data, etc. In general, toner usage may depend upon one or more of the following factors: system application, laser specifications, toner characteristics, OPR sensitivity, optimization of the system, environmental factors, etc.

The method 100 can exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of software program(s) on a CD ROM or via Internet download. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for estimating toner usage, the method comprising:
   determining a pulse width count;
   determining a pulse edge count; and
   calculating a toner usage value based on the pulse width count and the pulse edge count.

2. The method of claim 1, wherein the pulse width count may be determined for at least one of a pixel, a scan line, a page, a print job, and a usable lifespan of a toner cartridge.

3. The method of claim 1, wherein the pulse edge count may be determined for at least one of a pixel, a scan line, a page, a print job, and a usable lifespan of a toner cartridge.

4. The method of claim 1, wherein the calculating a toner usage value step further comprises the steps of:
   determining the temperature;
   determining the relative humidity; and
   utilizing at least one of the temperature and the relative humidity in conjunction with the pulse width count and the pulse edge count, to calculate the toner usage.

5. The method of claim 4, wherein one or more of a statistical regression equation, a lookup table based on the statistical regression equation are used for the calculating step.

6. A computer readable medium on which is embedded computer software, the software comprising a program, the program performing a method of estimating toner usage of a laser printer, the method comprising:
   determining a pulse width count;
   determining a pulse edge count; and
   calculating a toner usage value based on the pulse width count and the pulse edge count.

7. The computer readable medium of claim 6, wherein the pulse width count may be determined for at least one of a pixel, a scan line, a page, a print job, and a usable lifespan of a toner cartridge.

8. The computer readable medium of claim 6, wherein the pulse edge count may be determined for at least one of a pixel, a scan line, a page, a print job, and a usable lifespan of a toner cartridge.

9. The computer readable medium of claim 6, wherein the calculating a toner usage value step further comprises the steps of:
   determining the temperature;
   determining the relative humidity; and
   utilizing at least one of the temperature and the relative humidity in conjunction with the pulse width count and the pulse edge count, to calculate the toner usage.

10. The computer readable medium of claim 9, wherein one or more of a statistical regression equation, a lookup table based on the statistical regression equation are used for the calculating step.

11. An apparatus for estimating toner usage, the apparatus comprising:
    a processor system configured to determine a pulse width count and a pulse edge count based on a print job, wherein the processor system is further configured to calculate the toner usage based on the pulse width count and the pulse edge count.

12. The apparatus of claim 11, wherein the processor system comprises at least one processor associated with one or more of a PC, a print spooler, a printer and a network component.

13. The apparatus of claim 12, further comprising one or both of a statistical regression equation and a lookup table based on the statistical regression equation, wherein the processor system is configured to utilize the one or both of the statistical regression equation and the lookup table based on the statistical regression equation to determine the toner usage based on the pulse width count and the pulse edge count.

14. The apparatus of claim 13, further comprising a memory configured to store one or more of the pulse width count, the pulse edge count, the estimated toner usage, associated toner usage values, the statistical regression equation and the lookup table based on the statistical regression equation.

15. The apparatus of claim 11, further comprising a toner cartridge.

16. The apparatus of claim 15, wherein the toner cartridge is configured to contain a predetermined amount of toner.

17. The apparatus of claim 16, wherein the processor system is configured to determine a toner remaining value based on the predetermined amount of toner and the toner usage.

18. The apparatus of claim 17, wherein the toner cartridge comprises a memory.

19. The apparatus of claim 18, wherein the memory is configured to store, at least, the toner remaining value.

20. The apparatus of claim 11, wherein the processor is an application specific integrated circuit.

21. An apparatus for estimating toner usage, the apparatus comprising:
    means for determining a pulse width count;
    means for determining a pulse edge count; and
    means for calculating a toner usage value based on the pulse width count and the pulse edge count.

22. The apparatus of claim 21, wherein the means for determining a pulse width count includes a means for determining the pulse width count for at least one of a pixel, a scan line, a page, a print job, and a usable lifespan of a toner cartridge.

23. The apparatus of claim 21, wherein the means for determining a pulse edge count includes a means for determining the pulse edge count for at least one of a pixel, a scan line, a page, a print job, and a usable lifespan of a toner cartridge.

24. The apparatus of claim 21, wherein the means for calculating a toner usage value further comprises:

means for determining the temperature;

means for determining the relative humidity; and means for utilizing at least one of the temperature and the relative humidity in conjunction with the pulse width count and the pulse edge count, to calculate the toner usage.

25. The apparatus of claim 24, wherein the means for calculating the toner usage value further includes a means for utilizing one or more of a statistical regression equation and a lookup table based on the statistical regression equation for calculating the toner usage value.

* * * * *